(12) United States Patent
Patterson (10) Patent No.: US 7,970,705 B2
(45) Date of Patent: *Jun. 28, 2011

(54) RECURRING TRANSACTION PROCESSING

(75) Inventor: Barbara Patterson, South San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/608,215

(22) Filed: Oct. 29, 2009

(65) Prior Publication Data

US 2010/0299253 A1 Nov. 25, 2010

Related U.S. Application Data

(60) Provisional application No. 61/180,167, filed on May 21, 2009.

(51) Int. Cl.
*G06Q 40/00* (2006.01)
(52) U.S. Cl. .................. 705/44; 705/35; 705/39; 705/40
(58) Field of Classification Search .................... 705/35, 705/40, 39, 41, 44; 235/380
See application file for complete search history.

(56) References Cited

U.S. PATENT DOCUMENTS

| | | | |
|---|---|---|---|
| 4,485,300 A * | 11/1984 | Peirce | 235/380 |
| 6,427,140 B1 * | 7/2002 | Ginter et al. | 705/80 |
| 7,080,035 B1 | 7/2006 | Williams | |
| 2005/0021456 A1 | 1/2005 | Steele et al. | |
| 2005/0149544 A1 | 7/2005 | Bishop et al. | |

(Continued)

FOREIGN PATENT DOCUMENTS

| | | |
|---|---|---|
| KR | 10-2001-0088934 A | 9/2001 |
| KR | 10-2003-0070070 A | 8/2003 |
| KR | 10-2004-0031434 A | 4/2004 |

OTHER PUBLICATIONS

The International Search Report for PCT Application No. PCT/US2010/034775, dated Dec. 28, 2010, 6 pages.

(Continued)

*Primary Examiner* — Ella Colbert
*Assistant Examiner* — Daniel L Greene, Jr.
(74) *Attorney, Agent, or Firm* — Kilpatrick Townsend & Stockton LLP (57) ABSTRACT

Techniques for processing of recurring payments are provided that do not require merchants to update consumer account information when a consumer is issued a new account number for a payment card or the like. For example, when a consumer is issued a new account number by an issuer, the new account number can be provided to a payment processing network. A server computer in the payment processing network then identifies any recurring payments associated with the user's old account number and provides the consumer with a list of merchants for which the consumer had established recurring payments associated with the old account number. The consumer is then provided the opportunity to select those merchants for whom the consumer wishes to continue the recurring payments using the new account number. The payment processing network then creates a mapping between the old account number and the new account number for the merchants designated by the consumer and continues to process recurring payment authorization requests received from the designated merchants using the old account information. As a result, the merchants do not need to make any updates to the consumer account information maintained by the merchants, and the consumer is provided with the ability to easily select which merchants can continue processing recurring payments using the old account number.

16 Claims, 7 Drawing Sheets

(a)

U.S. PATENT DOCUMENTS

2006/0116949 A1 6/2006 Wehunt et al.
2007/0067239 A1 3/2007 Dheer et al.
2008/0301037 A1* 12/2008 Monk .............................. 705/38
2009/0171839 A1 7/2009 Rosano et al.

OTHER PUBLICATIONS

The International Written Opinion for PCT Application No. PCT/US2010/034775, dated Dec. 28, 2010, 5 pages.

* cited by examiner

Old Account Number   1234567812345678

New Card Account Number   1234564562345678

Keep Merchant A   [Y] [N]

Keep Merchant B   [Y] [N]

[SUBMIT]

The following recurring payments will be continued. If you wish to discontinue recurring payments to any of the above merchants please indicate by selecting a Y and entering submit.

RECURRING TRANSACTION PROCESSING

CROSS-REFERENCES TO RELATED APPLICATIONS

This application claims priority from U.S. Provisional Patent Application No. 61/180,167, filed on May 21, 2009, the contents of which are hereby incorporated in its entirety by reference.

BACKGROUND

Recurring bill payments are made using payment cards such as credit cards. In some instances, external events can impact a cardholder's ability to use a pre-existing account number associated with a payment card to conduct recurring payments. Such external events may include the expiration of the payment card or the theft of the payment card. For example, when a payment card expires or is stolen, a new payment card is issued to the consumer, and the consumer needs to provide updated card information for each merchant that the consumer pays on a recurring basis.

Today, a service called VAU (Visa Account Updater) exists, which may be run using a server computer residing at a central location. In this service, the issuer of a payment card provides a file, which has new account information for its consumers (e.g., if the expiration date of a card changes, or if the card number changes—the card is lost, stolen, or replaced), to a payment processing network in a batch manner. The file may also specify who the new account information in the file can go to. For example, it may specify that only certain acquirers or merchants can receive the new account information. After the file is received, an acquirer associated with a merchant can provide a separate file with account numbers associated with recurring payments. The account numbers in the acquirer's file can be compared to the account numbers in the file received from the issuer. If there is a match, and if a merchant is authorized to receive the new card information, the merchant can use the new card information to continue to conduct recurring payments using the new card information instead of the user's old card information. In some cases, the merchant's use of the new card information for recurring payments may occur, even if the consumer is presently unsatisfied with the merchant's service. To stop the payment to any merchant, the consumer must contact that merchant to discontinue the relationship with that merchant.

Another service that exists is PPCS ("payment processing cancellation service"). This service allows consumers to call a customer service representative and ask that certain transactions not be authorized. In this case, the consumer must know which transactions he does not want to authorize, and must provide the customer service representative with this information.

A number of improvements can be made to conventional bill payment processing. For example, in the conventional processing described above, the user may still have to use the same merchant when a user's card status changes, even though the user is not currently satisfied with the merchant's service (or goods). Thus, the user has very little control over the application of new card information. Further, the merchant needs to receive the new card information in order to process recurring payments with the new card information. The additional distribution of the new account number makes the new account number more susceptible to being compromised. Merchants must also maintain the overhead associated with updating the account numbers of its customers. Lastly, conventional recurring payment processes are inconvenient for the user. If the user does not allow for the automatic replacement of his old card information for his new card information for recurring bill payments, then the user must remember all of the merchants that he uses for recurring payments, and must contact each merchant individually to change his card on file with that merchant from old card information to new card information.

Embodiments of the invention address these and other problems, individually and collectively.

BRIEF SUMMARY

Embodiments of the present invention are directed to methods, systems, and computer readable media associated with the processing of recurring payments.

One embodiment of the invention is directed to a method. The method includes receiving, at a server computer, old account information associated with a user, wherein the old account information is to be replaced with new account information. The server computer can generate a list of merchants associated with a set of recurring payments, where the recurring payments are made using the old account information. It can further provide the list of merchants for the user and can receive a response from the user. The response may indicate whether to continue processing recurring payments for the merchants using the new account information, and wherein the old account information is associated with an old payment card and the new account information is associated with a new payment card, wherein the old payment card and the new payment card are issued from the same issuer.

Another embodiment of the invention can be directed to a computer readable medium comprising code executable by a processor, for implementing the above-described method.

Another embodiment of the invention is directed to a server computer comprising a processor; and a computer readable medium coupled to the processor. The computer readable medium can comprise code executable by a processor, for implementing a method comprising (i) receiving, at a server computer, old account information associated with a user, wherein the old account information is to be replaced with new account information, (ii) generating a list of merchants associated with a set of recurring payments, wherein the recurring payments are made using the old account information, (iii) providing the list of merchants for the user, and (iv) receiving a response from the user, the response indicating whether to continue processing recurring payments for the merchants using the new account information, wherein the old account information is associated with an old payment card and the new account information is associated with a new payment card, wherein the old payment card and the new payment card are issued from the same issuer.

Another embodiment of the invention is directed to a method comprising receiving a list of merchants associated with a set of recurring payments to a user at a client device. The recurring payments are made using the old account information. The method also includes providing a response using the client device, the response indicating whether to continue processing recurring payments for the merchants using new account information.

These and other embodiments of the invention are described in further detail below.

DETAILED DESCRIPTION

Recurring payments can be regularly scheduled payments for goods, services, or debt. There are many types of merchants that can receive recurring payments using payment cards or the like. Such merchants may sell goods or services. Examples of such merchants include utilities, phone companies, clubs (e.g., wine of the month club), insurance companies, governmental agencies, media companies such as newspapers, magazine, and cable TV companies, etc.

When a consumer's card changes for some reason, this can disrupt the consumer and any recurring payments that he wants to make. For example, the consumer may want to upgrade his card, the card may be compromised, etc. Embodiments of the invention help the user re-establish recurring payments with only desired merchants, when the user has received or will receive new account information associated with a new payment card.

In embodiments of the invention, techniques for the processing of recurring payments are provided that do not require merchants to update consumer account information when a consumer is issued new account information for a payment card or the like. For example, when a consumer is issued a new account number by an issuer, the new account number can be provided to a payment processing network. A server computer in the payment processing network then identifies any recurring payments associated with the user's old account number and provides the consumer with a list of merchants for which the consumer had established recurring payments associated with the old account number. The consumer is then provided the opportunity to select those merchants for whom the consumer wishes to continue the recurring payments using the new account number. The payment processing network then creates a mapping between the old account number and the new account number for the merchants designated by the consumer and continues to process recurring payment authorization requests received from the designated merchants using the old account information. As a result, the merchants do not need to make any updates to the consumer account information maintained by the merchants, and the consumer is provided with the ability to easily select which merchants can continue processing recurring payments.

In embodiments of the invention, "old account information" and "new account information" are typically associated with an old payment card and a new payment card, respectively. The old payment card and the new payment card can be issued from the same issuer (e.g., an issuing bank). They may include any suitable combination of account elements including an account number, an expiration date, a new CVV (card verification value) value, a new CVV2 value, a new address, a new phone number, etc. In some cases, many of the account elements in the old and new account information may differ. For example, the account number, the expiration date, the CVV, and CVV2 values associated with the new and old account information can be different. In another example, only the expiration date is different between the old account information and the new account information.

It is also noted that "old account information" and "new account information" are associated with the same person or household, and that either the old account information or the new account information can be used to make purchases, but both are not used at the same time. The old account information can be inactive or can be inactivated in the near future. For example, the current date might be Jan. 1, 2011 and the old account information might include an expiration date of Feb. 1, 2011, and the new account information may be activated on Feb. 2, 2011. Between Jan. 1, 2011 and Feb. 1, 2011, the old account information can still be active, while after Feb. 1, 2011 it is inactive. Thus, the old account information and the new account information may be active or inactive, depending on the circumstance.

I. Systems

Systems according to embodiments of the invention can be described with reference to FIGS. 1-4. Although a small number of consumers, client devices, merchants, acquirers, payment processing networks, and issuers are shown in FIG. 1, it is understood that embodiments of the invention are not limited thereto and embodiments of the invention may include any suitable number of entities.

Figure 1:
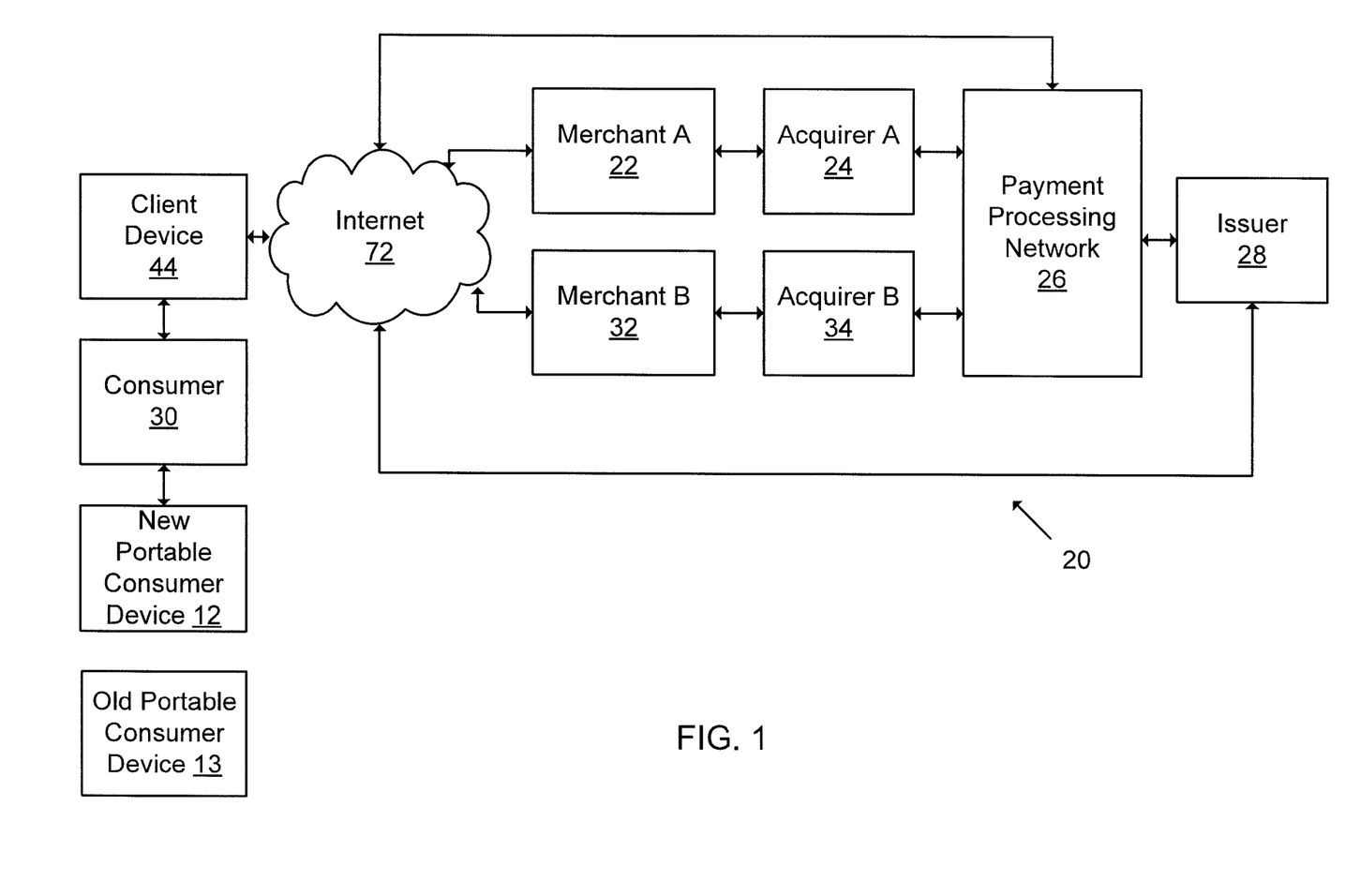
FIG. 1 shows a block diagram illustrating a system according to an embodiment of the invention.

FIG. 1 shows a system 20 that can be used in an embodiment of the invention. The system 20 includes two merchants, merchant A 22 and merchant B 32. Merchant A 22 could be a wireless carrier used by the consumer 30 and merchant B 32 may be a cable TV company used by the consumer 30. Acquirers A 24 and B 34 may be respectively associated with and in communication with merchants A 22 and B 32. Acquirers A 24 and B 34 can be banks or other entities that hold accounts for the merchants A 22 and B 32. They may communicate with an issuer 28 of a new portable consumer device 12 and an old portable consumer device 13 via a payment processing network 26.

The consumer 30, who may also be referred to as a "user," may be an individual, or an organization such as a business that is capable of purchasing goods or services. The consumer 30 may use a portable consumer device to make recurring payments to the merchants A 22 and B 32.

The old and new portable consumer devices may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

The payment processing network 26 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 26 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing network 26 may use any suitable wired or wireless network, including the Internet.

Figure 2:
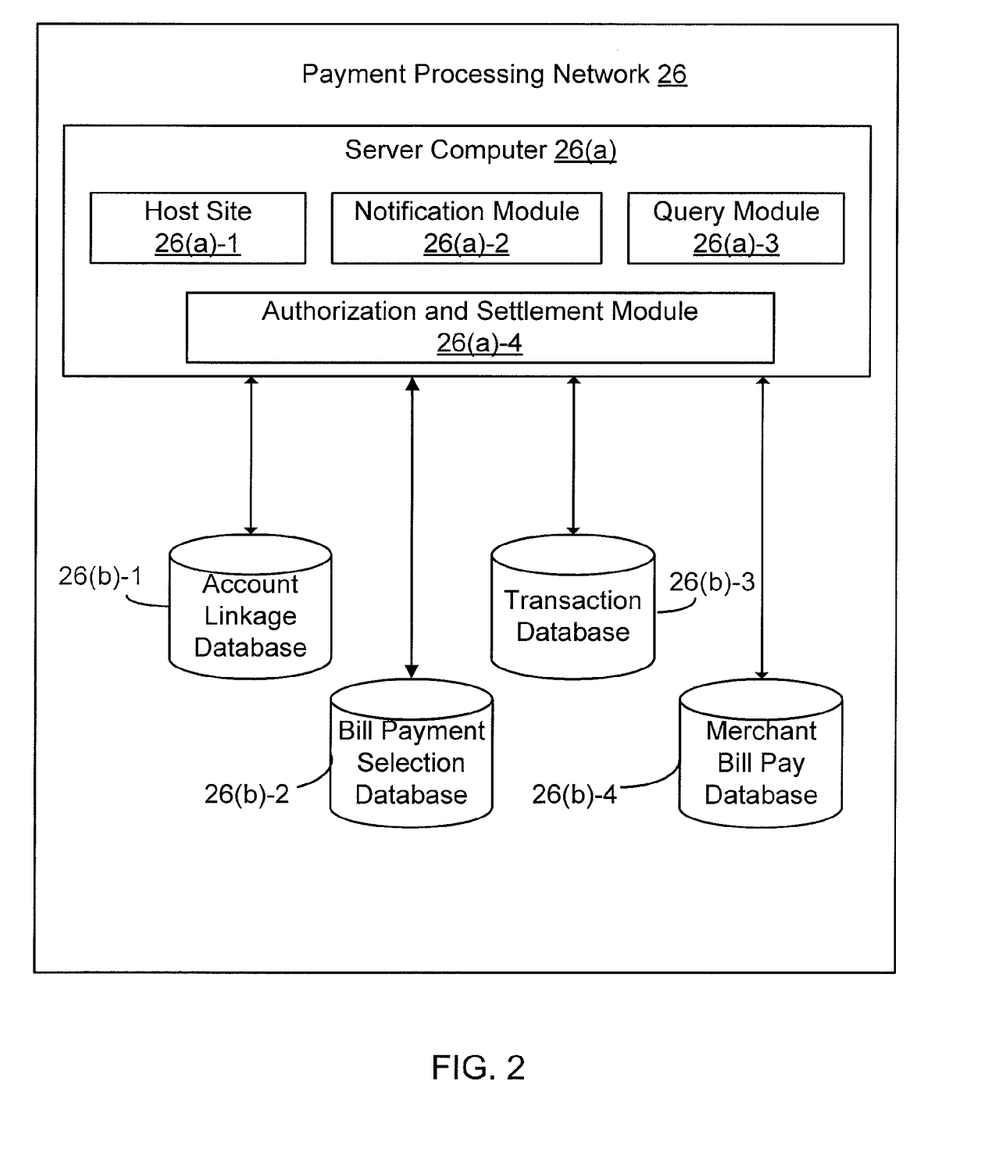
FIG. 2 shows a block diagram illustrating a payment processing network that may be used to implement the recurring payment processing techniques disclosed herein according to an embodiment of the invention.

Referring to FIG. 2, the payment processing network 26 may comprise a server computer 26(*a*) comprising a host site 26(*a*)-1, a notification module 26(*a*)-2, a query module 26(*a*)-3, and an authorization and settlement module 26(*a*)-4. The components running on the server computer 26(*a*) may be embodied by computer code or software that is stored on a computer readable medium and is executable by a processor in the server computer 26(*a*). The computer code or software may cause the processor to perform a method including (i) receiving, at the server computer, old account information associated with the user, wherein the old account information is to be replaced with new account information, (ii) generating a list of merchants associated with a set of recurring payments to the user, wherein the recurring payments are made using the old account information, (iii) providing the list of merchants to the user, and (iv) receiving a response from the user, the response indicating whether to continue processing recurring payments for the merchants using the new account information. The response may indicate whether or not to continue processing recurring payments and may include a selection of one or more merchants indicating an intent to continue with recurring payments or an intent that one or more recurring payments are to stop.

The host site 26(*a*)-1 may be a Web site that can be accessed by the consumer 30 using the client device 44. The notification module 26(*a*) may be configured to cause the server computer 26(*a*) to provide the list of merchants associated with an old portable consumer device to the client device 44 operated by the consumer 32. The query module 26(*a*)-3 may query the transaction database 26(*b*)-3 for recurring payment transaction data associated with the old account information, and may return a list of transactions or merchants associated with such payments. The authorization and settlement module 26(*a*)-4 may be used to submit and modify authorization request messages and authorization response messages, and may also be used to perform clearing and settlement processes. It may also be used to store transaction information for various payment transactions between multiple issuers and acquirers in the transaction database 26(*b*)-3.

Various databases may be in communication with the server computer 26(*a*). They may include an account linkage database 26(*b*)-1, which may store data linking old account information to new account information (and to authorized merchants), a bill payment selection database 26(*b*)-2 for storing merchant selection data from the consumer 30, a transaction database 26(*b*)-3 for storing transactions processed by the authorization and settlement module 26(*a*)-4, and a merchant bill pay database 26(*b*)-4, which may include a list of merchants that have registered with the system. The various databases may include any type of commercially available database such as an Oracle™ database.

Figure 3:
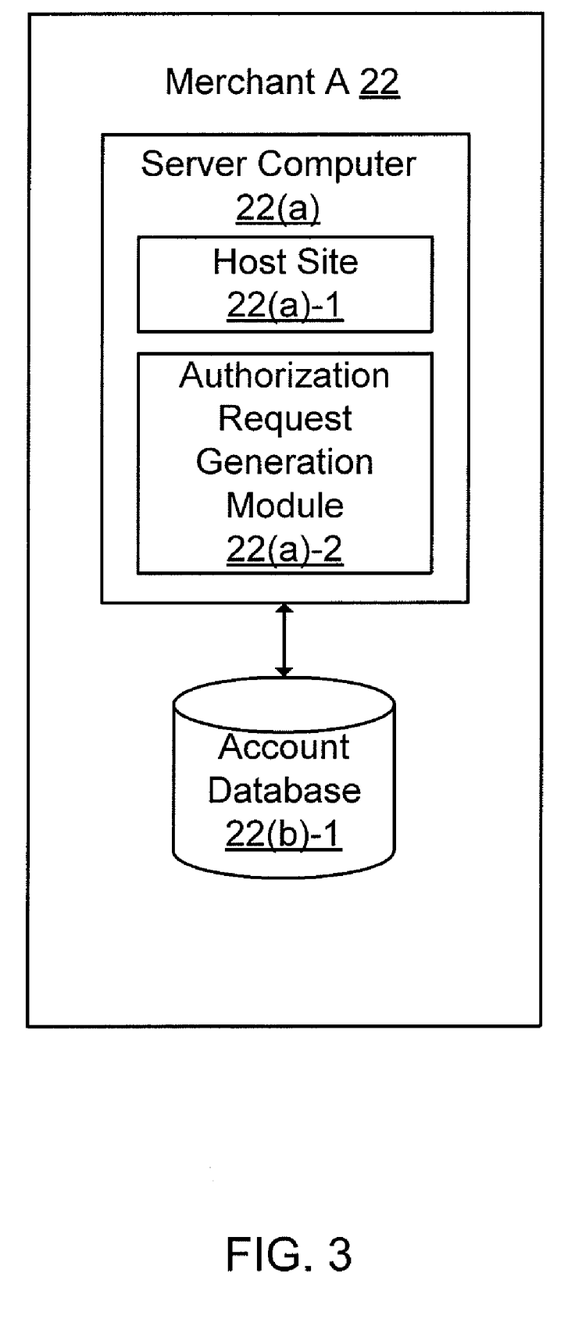
FIG. 3 shows a block diagram of some components at a merchant.

With reference to FIG. 3, each merchant A 22 and B 32 may operate a server computer. For example, merchant A 22 may operate a server computer 22(*a*), which may comprise a host site 22(*a*)-1, and an authorization request generation module 22(*a*)-2. The authorization request generation module 22(*a*)-2 may generate authorization request messages for the consumer 30 based on a periodic schedule (e.g., weekly, monthly, bimonthly, annually) for predetermined amounts. Such authorization request messages are forwarded to the issuer 28, via the merchant's acquirer 24 and the payment processing network 26. Each authorization request message may include one or more of the following: the transaction amount, a merchant category code, a merchant identifier (such as a merchant verification value or card acceptor value), a recurring payment indicator (which distinguishes recurring payment transactions from non-recurring payment transactions), and the account number (which may include a BIN or bank identification number, a check digit, and other information), the expiration date, and a verification value associated with the old portable consumer device 13.

An account database 22(*b*)-1 may be in operative communication with the server computer 22(*a*)-1. The account database 22(*b*)-1 may store old account information associated with the old portable consumer device 13, and other portable consumer devices used by other consumers that buy goods or services from the merchant A 22. In embodiments of the invention, it does not store new account information.

The merchants A 22 and B 32 be in operative communication with the consumer's client device 44 via the Internet 72 or some other communication medium.

The client device 44 could be a personal computer, a laptop computer, a mobile phone, etc. The client device 44 may act as a Web client and may include a Web browser program such as Internet Explorer. Web browser programs request web pages from web server programs using the hypertext transport protocol (HTTP). Web server programs running on a server computer can receive these requests and, where appropriate return corresponding web pages. The client device may comprise a processor, and a computer readable medium coupled to the processor. The computer readable medium may comprise code, executable by the processor, for implementing a method comprising: receiving a list of merchants associated with a set of recurring payments for a user, wherein the recurring payments are made using the old account information, and providing a response indicating whether to continue processing recurring payments for the merchants using new account information.

Figure 4:
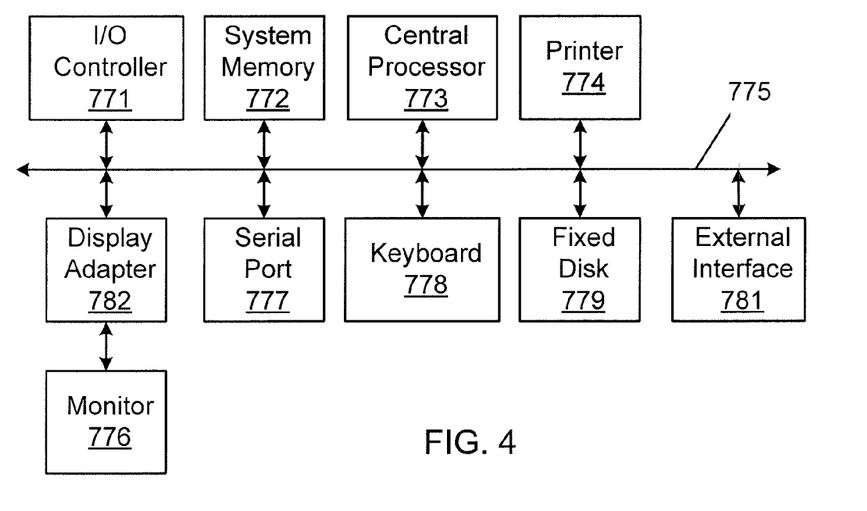
FIG. 4 shows a block diagram of a computer apparatus that may be used to implement the payment processing techniques disclosed here according to an embodiment of the invention.

The various participants and elements (e.g., the issuer 28, the payment processing network 26, the server computer 26(*a*), the merchants A 22 and B 32, merchant server computer 22(*a*), the acquirers A 24 and B 34, and the client device 44) in FIGS. 1-3 may operate one or more computer apparatuses (e.g., a server computer) to facilitate the functions described herein. Any of the elements in FIGS. 1-3 may use any suitable number of subsystems to facilitate the functions described herein. Examples of such subsystems or components are shown in FIG. 4. The subsystems shown in FIG. 4 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

II. Methods

Methods according to embodiments of the invention can be described with reference to FIGS. 6-8, with reference to FIGS. 1-5. It is understood that the steps described in the methods described in FIGS. 6-8 can be performed in any suitable order and are not limited to the specific orders shown in the Figures.

Figure 6:
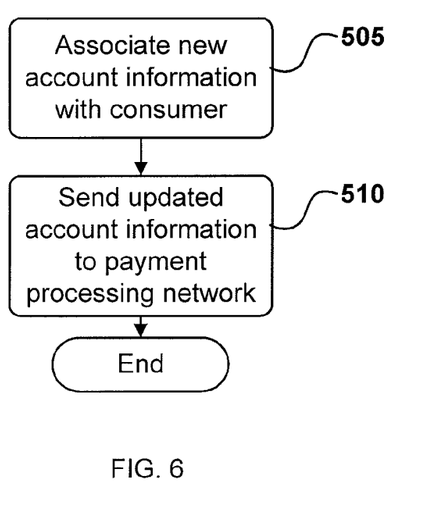
FIG. 6 is a high level flow diagram of process for receiving associating a customer account with a new account number according to an embodiment.

FIG. 6 is a flow diagram of process for associating new account information with a consumer.

First, new account information including a new account number is associated with a consumer 30 (step 505). The new account information may be provided by the issuer 28 on its own (e.g., when a payment card is about to expire) or at the request of the consumer 30 (e.g., when the consumer loses his payment card or it is stolen).

Updated new account information is then sent to the payment processing network 26 (step 510), from the issuer 28. The new account information may be received at the payment processing network 26 and the server computer 26(*a*) may link the new account information and the old account information in the account linkage database 26(*b*)-1.

Figure 7:
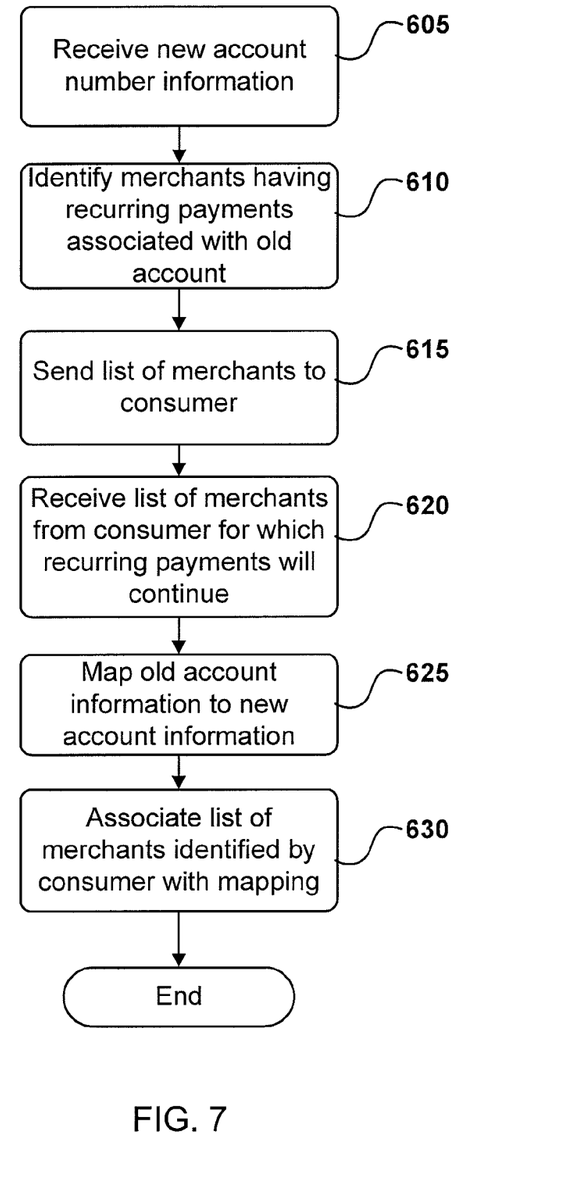
FIG. 7 is a high level flow diagram of process for mapping an old customer account number to a new customer account number according to an embodiment.

FIG. 7 is a flow diagram of process for mapping a list of merchants to the old account information and the new account information.

New account information is received at the payment processing network 26 (step 605) from the issuer 28 or some other source.

Before or after step 605, the consumer 30 can receive a message from the issuer 28 or the payment processing network 26. For example, the issuer 28 (e.g., a bank that may issue the new portable consumer device 12 and previously issued the old portable consumer device 13) may send a message (e.g., an e-mail, text message, etc.) to the client device 44 (e.g., a computer, a phone, etc.) operated by the consumer 30 via the Internet 72. The message may ask the consumer 30 if he would like to re-establish all recurring bill payments with the new account information.

The consumer 30 may then reply to the issuer 28 and/or the payment processing network 26 with an affirmative message. If the issuer 28 receives this information, then the issuer 28 may forward this information to the payment processing network 26.

After the new account information is received at the payment processing network 26, the server computer 26(*a*) in the payment processing network 26 identifies merchants having recurring payments associated with the old account for the consumer 30 (step 610). Using the old account information, the server computer 26(*a*) in the payment processing network 26 (e.g., VisaNet) can use the query module 26(*a*)-3 to run a query to identify all events that occurred in the last 13 months or other predetermined time frame (13 months is a typical period in which all recurring payment transactions can be captured). The identified events may be recurring bill payments which made to many merchants (e.g., merchants A and B 22, 32, which may be associated with acquirers A and B 24, 34) using the old portable consumer device 13.

Figure 5A:
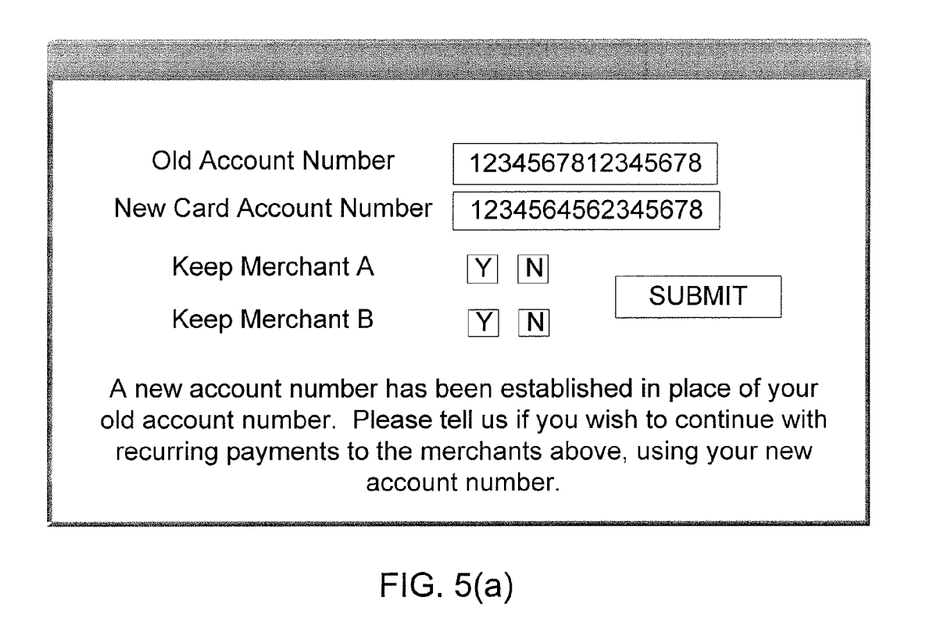
FIG. 5(a) shows a user interface for selecting merchants for which recurring payments should be continued according to an embodiment.

After the merchants are identified, a list of merchants is sent to the consumer 30 (step 615). For example, the server computer 26(*a*) in the payment processing network 26 may send an e-mail or other message to the consumer's client device 44 with the merchant list. Alternatively, a link may be sent to the consumer's client device 44 with a command to redirect the client device's browser to a Web site with the merchant list. The merchants in the merchant list may be listed on one screen, or may be displayed sequentially to the consumer 30 on different screens. An example of a list of merchants is provided in FIG. 5(*a*), which is an exemplary graphical user interface embodied in a Web page that might be seen by a consumer 30 on the client device 44.

In embodiments of the invention, recurring payment authorization request messages are tagged and are unique. They also tend to come from certain MCCs (merchant category codes). Thus, the list of merchants that has recurring payment processes with the consumer can be easily generated.

In some cases, the merchants such as merchants A and B 22, 32, could register with the payment processing network 26 for this service, indicating that they will permit the payment processing network 26 to ask the consumer 30 if he wants to continue to pay the merchants in a recurring manner. This registration information may be stored in the merchant bill pay database 26(*b*)-4.

After the merchant list is provided to the consumer 30, the consumer may provide a response indicating whether to continue processing recurring payments for merchants using the new account information. For example, the consumer 30 uses the client device 44 to select some, all, or none of the merchants with which he wants to continue to pay in a recurring manner. This selection information is sent to and is received at the payment processing network 26 (step 620). The selection information may be stored by the server computer 26(*a*) in the bill payment selection database 26(*b*)-2. In other embodiments, the consumer 30 may be provided with a list of merchants and a message indicating the recurring bill payments will continue unless the consumer 30 indicates that the recurring payments are to stop.

As noted above, an example of a Web page that asks the consumer questions is shown in FIG. 5(*a*). For those merchants that the consumer does want to continue with recurring payments, the new account information can be used for those recurring payments. As shown in FIG. 5(*a*), the Web page may show the consumer's old account number and the new account number. The consumer 30 may use an input device (e.g., a mouse) in the client device 44 to indicate that the consumer 30 intends to or does not intend to make recurring payments to one or more merchants. In this example, the consumer 30 may indicate that he does want to pay Merchant A 22, but does not want to pay Merchant B 32 anymore. Merchant A 22 may therefore be considered an authorized merchant. On the other hand, Merchant B 32 may be considered an unauthorized merchant.

Figure 5B:
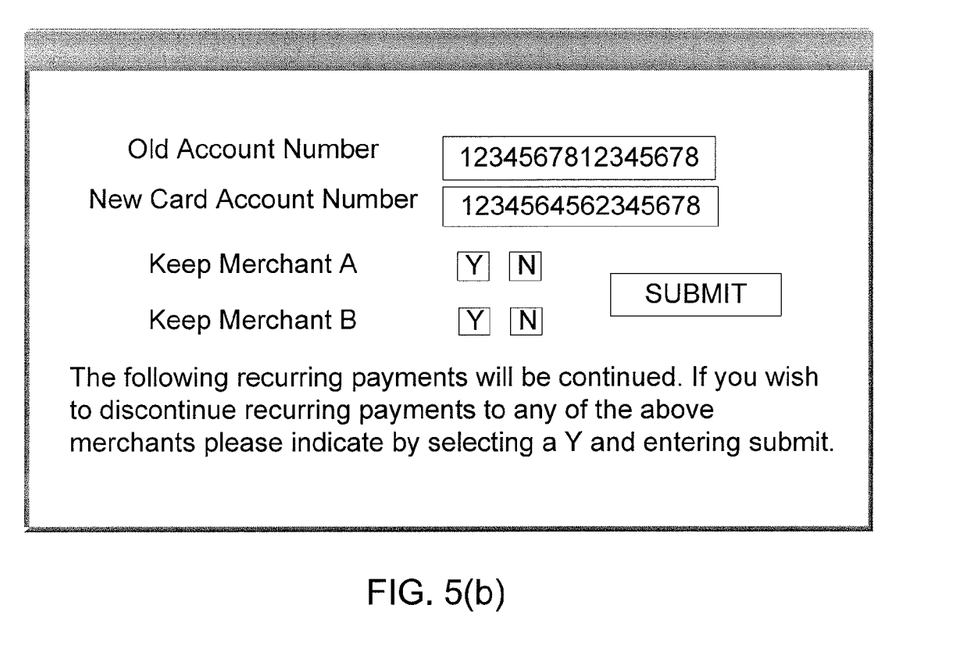
FIG. 5(b) shows a user interface allowing a user to indicate that he wants to stop recurring payments.

FIG. 5(*b*) shows a screen similar to FIG. 5(*a*), but includes the message "The following recurring payments will be continued. If you wish to discontinue recurring payments to any of the above merchants please indicate by selecting a Y and entering submit." Thus, in this example, recurring payments continue unless the consumer specifies that he does not want to continue.

After the bill payment selection information is received at the server computer 26(*a*) in the payment processing network 26 from the consumer 30, the server computer 26(*a*) may then map the old account information and the new account information (step 625), if this has not yet been done. Note that step 625 could alternatively be performed before the list of merchants is sent to the consumer 30.

The list of selected merchants is then associated with the mapped old and new account numbers (step 630). This information may be stored in the account linkage database 26(b)-1. This information may be used to determine whether future recurring payments from various merchants are authorized to proceed or are not authorized to proceed.

For those merchants that the consumer does not want to continue to pay in a recurring manner, the payment processing network 26 (or server computer therein) can creates a PPCS (preauthorization payment cancellation service) entry that goes into the payment processing network 26 so that when recurring payment authorization requests to those merchants occur, they are declined. PPCS is intended to stop transactions that consumers do not want. In this service, consumers can indicate that specific transactions should not be authorized.

Instead of having to query a database for new information as is done in conventional processing, in embodiments of the invention, it is possible to change what the issuer 28 has to do. New and old account information can be linked together (e.g., account linking–new card+old card). The payment processing network 26 can store this information, so that when a merchant (e.g., merchant B 32) sends a transaction authorization request message, it would be flagged or stopped at the payment processing network 26 as a request that should be declined.

Embodiments of the invention require little effort on the part of the merchants. As will be described in further detail below, merchants can simply send authorization request messages to issuers as they normally would, and the payment processing network 26 can determine whether or not the merchant can participate.

Figure 8:
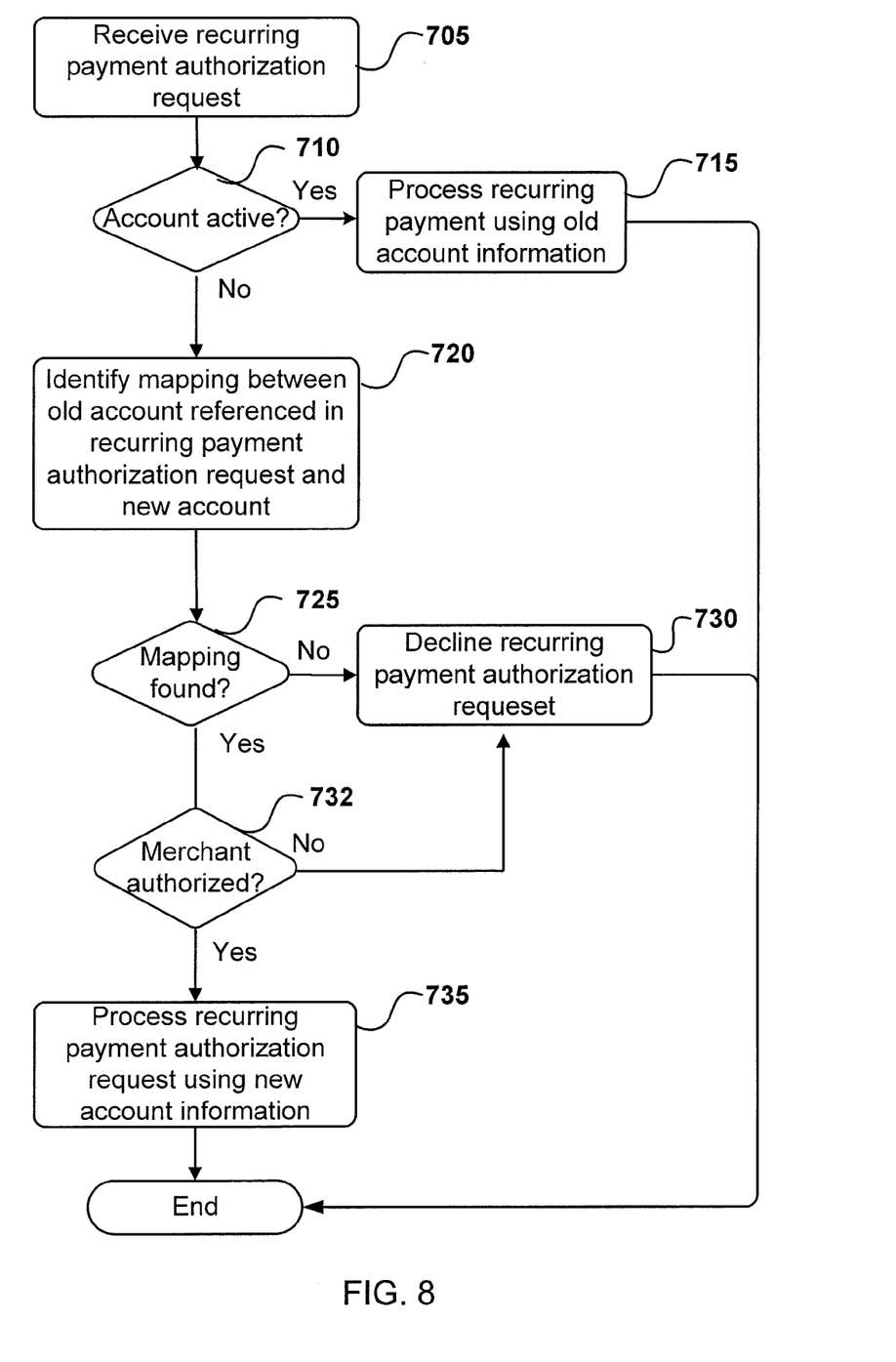
FIG. 8 is a high level flow diagram of process for processing recurring payment authorization requests according to an embodiment.

FIG. 8 is a flow diagram of process for processing recurring payment authorization requests according to an embodiment of the invention, after the consumer 30 has selected which merchants he wants to continue paying in a recurring manner.

In a recurring payment transaction, at a particular time (e.g., at the beginning of every week, month, year, etc.) an authorization request message comprising information including old account information, a merchant category code, a merchant identifier such as a merchant verification value or card acceptor value, a recurring payment indicator, and other information is forwarded from the merchant A 22 to the acquirer 24. After receiving the authorization request message, the authorization request message is then sent to and is received by the payment processing network 26 (step 705).

The server computer 26(a) in the payment processing network 705 then determines if the received account information is active or not (step 710). If it is, then the processing of recurring payment can be processed normally (step 715). In other words, the authorization request message can be sent to the issuer 28 and the issuer 28 can approve or decline the authorization request message, and then reply back to the merchant A 22 that it is either approved or declined (e.g., depending upon whether or not there is sufficient credit or value in the account, etc.).

If the account information is not active (e.g., when a card associated with the account information has been stolen or has expired), the payment processing network 26 identifies the information as old account information and identifies mapping between the old account information in the authorization request message and the new account information associated with the old account information (step 720).

At step 725, the server computer 26(a) determines if mapping is found. If no mapping information is found, then the authorization request message may be declined 730 or it may be sent to the issuer 23 with this information so that the issuer 28 can decide whether or not to approve or decline the transaction.

If mapping is found (e.g., in the case where the consumer 30 affirmatively indicated that he wants to continue to pay Merchant A 22 in a recurring manner), then the server computer 26(a) in the payment processing network 26 can determine if the merchant is authorized by the consumer 30 to be paid in a recurring manner (step 732). Authorization may not be present, because the consumer 30 previously indicated that he did not to continue paying a merchant, such as Merchant B 32, in a recurring manner. If it is not, then the authorization, then the authorization request message may be declined 730 or it may be sent to the issuer 23 with this information so that the issuer 28 can decide whether or not to approve or decline the transaction. The declined merchant would then have to follow up with the consumer 30 to determine why the consumer 30 decided not to continue to pay the merchant in a recurring manner.

If the merchant is authorized to receive a recurring payment from the consumer 30, then the authorization request message may be modified with the new account information and the modified authorization request message is forwarded to the issuer 28 for approval. Non-relevant old account information (e.g., an old expiration date and/or old account number) may be deleted before the modified authorization request message is sent to the issuer 28.

After the modified authorization request message is received by the issuer 28, an authorization response message is then sent by the issuer 28 to merchant A 22 via the payment processing network 26 and the acquirer A 24 either approving or denying the authorization request message. The approval or denial of the transaction can depend on considerations such as whether or not there is sufficient value in the account and/or whether the transaction is or is not considered to be authentic.

When the payment processing network 26 receives the authorization response message, it may substitute the old account information for any new account information in the authorization response message. The modified authorization response message may then be forwarded to the merchant A 22 via the acquirer A 24. This ensures that the merchant such as merchant A 22 does not retain the new account information, thus reducing the distribution of the new account information, thereby decreasing the risk that the new account information may be compromised by an unauthorized person or entity.

New account information could be distributed to the merchant, but only if the merchant is registered.

At the end of the day, a normal clearing and settlement process can be conducted by the transaction processing system 26. A clearing process is a process of exchanging financial details between and acquirer and an issuer to facilitate posting to a consumer's account and reconciliation of the consumer's settlement position. Clearing and settlement can occur simultaneously. The clearing and settlement process can also use the previously described linking data to ensure that the appropriate merchants get credited and that the appropriate consumer accounts get debited.

It is also possible to create a process unique to lost/stolen cards that is different from the re-issuance of cards. For example, if a card is reissued because an old card is lost or stolen, then the recurring payments may simply continue with the new card, without asking the consumer if he wants to continue with certain recurring payments. If a card is reissued because an old card is expired, the consumer may be asked if recurring payments are to continue as explained above. This difference in processing may be desirable for a consumer, because the consumer can be asked to reaffirm recurring payments only upon an expected periodic basis, instead of upon an unexpected event such as when a card is lost or stolen.

There are numerous advantages provided by embodiments of the invention. First, the payment processing network is eliminating the need to have any of the new information. The new information has been stored in the payment processing network, so that the merchant does not need to store it. Second, because the merchants do not have to store changes in consumer data, the consumer's data is more secure. Third, compared to conventional processes, embodiments of the invention reduce the number of steps needed to change the status of a payment card with respect to recurring bill payments. Fourth, the merchant can send whatever information it wants in a transaction authorization request message, and the payment processing network can have account link information (expiration date and card number) that will allow the transaction to proceed or not proceed. Fifth, embodiments of the invention can move from a batch process to an online process and can provide more capability and more consumer control over a recurring payment process. Sixth, the merchant registration process can leverage existing merchant registration processes such as an MVV (merchant verification value) registration process. In some cases, there is no additional signup complexity. Seventh, in embodiments of the invention, the merchant can get a decline, which says that the consumer does not want the merchant's products anymore. This decline is not due to insufficient funds. The consumer is simply confirming that he does not want it. This results in fewer chargebacks and reduces unnecessary activity and overhead. Eighth, merchants need not maintain the overhead associated with updating account numbers, as this is done at the payment processing network. Thus, embodiments of the invention can also reduce costs, while making processing more efficient.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network. In other embodiments, authorization and clearing could happen at the same time as in a single message system.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:

receiving, at a server computer, old account information associated with a user, wherein the old account information is to be replaced with new account information;

generating a list of merchants associated with a set of recurring payments, wherein the recurring payments are made using the old account information;

providing the list of merchants for the user; and receiving a response from the user, the response indicating whether to continue processing recurring payments for the merchants using the new account information, wherein the old account information is associated with an old payment card and the new account information is associated with a new payment card, wherein the old payment card and the new payment card are issued from the same issuer, wherein the response from the user indicates that an authorized merchant in the list of merchants is to be paid using a recurring payment process using the new account information, and wherein the method further comprises, after receiving the response from the user, receiving an authorization request message from the authorized merchant, and sending an authorization response message to the authorized merchant, wherein the authorization response message indicates whether or not the authorization request message is approved or denied, and wherein the method further comprises, modifying the authorization request message to exclude the old account information and to include the new account information, and sending the modified authorization request message to the issuer, wherein the authorization request message comprises a recurring payment indicator, an account number, a merchant identifier, and a transaction amount.

2. The method of claim 1, wherein the merchants include one or more of a telephone company, a cable television company, or a utility company.

3. The method of claim 1 wherein the list of merchants is provided to the user using a graphical user interface, which comprises a web page, and wherein the method further comprises:

generating and sending a message to the user, which directs the user to the web page.

4. The method of claim 1, wherein the authorization request message is a first authorization request message and wherein the authorization response message is a first authorization response message, and wherein the response from the user indicates that a merchant in the list of merchants is not to be paid using a recurring payment process using the new account information and is an unauthorized merchant, and wherein the method further comprises, after receiving the response from the user:

receiving a second authorization request message from the unauthorized merchant; and sending a second authorization response message to the unauthorized merchant, wherein the second authorization response message indicates that the second authorization request message is denied.

5. The method of claim 4 wherein the server computer is present in a payment processing network located between issuers and acquirers.

6. The method of claim 1, wherein the authorized merchant does not store the new account information.

7. The method of claim 6 wherein the server computer is present in a payment processing network located between issuers and acquirers.

8. The method of claim 1 wherein the method further comprises receiving, at the server computer, registration information from one or more of the merchants in the list of merchants.

9. The method of claim 1 wherein the authorized merchant stores the old account information, but not the new account information.

10. The method of claim 1 wherein the server computer is present in a payment processing network located between issuers and acquirers.

11. A non-transitory computer readable medium comprising code executable by a processor, for implementing a method comprising:
receiving, at a server computer, old account information associated with the user, wherein the old account information is to be replaced with new account information;
generating a list of merchants associated with a set of recurring payments, wherein the recurring payments are made using the old account information;
providing the list of merchants for the user; and
receiving a response from the user, the response indicating whether to continue processing recurring payments for the merchants using the new account information, wherein the old account information is associated with an old payment card and the new account information is associated with a new payment card, wherein the old payment card and the new payment card are issued from the same issuer,
wherein the response from the user indicates that an authorized merchant in the list of merchants is to be paid using a recurring payment process using the new account information, and wherein the method further comprises, after receiving the response from the user,
receiving an authorization request message associated from the authorized merchant, and
sending an authorization response message to the authorized merchant, wherein the authorization response message indicates whether or not the authorization request message is approved or denied,
and wherein the method further comprises,
modifying the authorization request message to exclude the old account information and to include the new account information, and
sending the modified authorization request message to the issuer,
wherein the authorization request message comprises a recurring payment indicator, an account number, a merchant identifier, and a transaction amount.

12. The computer readable medium of claim 11 wherein the list of merchants is provided to the user using a graphical user interface, which comprises a web page, and wherein the method further comprises:
generating and sending a message to the user, which directs the user to the web page.

13. The computer readable medium of claim 11, wherein the authorization request message is a first authorization request message and wherein the authorization response message is a first authorization response message, and wherein the response from the user indicates that a merchant in the list of merchants is not to be paid using a recurring payment process using the new account information and is an unauthorized merchant, and wherein the method further comprises, after receiving the response from the user:
receiving a second authorization request message associated from the unauthorized merchant; and
sending a second authorization response message to the unauthorized merchant, wherein the second authorization response message indicates that the second authorization request message is denied.

14. The computer readable medium of claim 11 wherein the authorized merchant stores the old account information, but not the new account information.

15. A server computer comprising:
a processor; and
a computer readable medium coupled to the processor, the computer readable medium comprising code executable by a processor, for implementing a method comprising (i) receiving, at a server computer, old account information associated with the user, wherein the old account information is to be replaced with new account information, (ii) generating a list of merchants associated with a set of recurring payments, wherein the recurring payments are made using the old account information, (iii) providing the list of merchants for the user, and (iv) receiving a response from the user, the response indicating whether to continue processing recurring payments for the merchants using the new account information, wherein the old account information is associated with an old payment card and the new account information is associated with a new payment card, wherein the old payment card and the new payment card are issued from the same issuer,
wherein the response from the user indicates that an authorized merchant in the list of merchants is to be paid using a recurring payment process using the new account information, and wherein the method further comprises, after receiving the response from the user,
receiving an authorization request message from the authorized merchant; and
sending an authorization response message to the authorized merchant, wherein the authorization response message indicates whether or not the authorization request message is approved or denied,
and wherein the method further comprises,
modifying the authorization request message to exclude the old account information and to include the new account information, and
sending the modified authorization request message to the issuer,
wherein the authorization request message comprises a recurring payment indicator, an account number, a merchant identifier, and a transaction amount.

16. The server computer of claim 15 wherein the authorized merchant stores the old account information, but not the new account information.

* * * * *